Aug. 4, 1931.  W. POTTER  1,817,761

SCRAPER

Filed Oct. 27, 1930

INVENTOR.
William Potter
BY
ATTORNEY

Patented Aug. 4, 1931

1,817,761

UNITED STATES PATENT OFFICE

WILLIAM POTTER, OF NEW YORK, N. Y.

SCRAPER

Application filed October 27, 1930. Serial No. 491,397.

This invention relates to scrapers employing two jaw members within and between which a scraper blade is adapted to be clamped, the cutting edge of the blade projecting beyond said jaws to facilitate its movement over a surface to be scraped; and the object of the invention is to provide a tool of the class specified employing relatively narrow blades attachable and detachable with respect to one end portion of the jaw members employed for supporting the blades, said jaw members being provided with means for supporting the blade within the boundaries of said jaw members when the blade is not in use; a further object being to provide a blade of the class specified, the opposite side edges of which are fashioned to form cutting edges, one of the jaw members being recessed to provide clearance for the inner cutting edge of the blade when the outer cutting edge is in position for use; a further object being to provide a relatively large recess which will permit the mounting of the blade so as to dispose the outer or projecting cutting edge angularly with respect to the transverse plane of the jaw members; a further object being to provide means for coupling the jaw members together and for clamping a blade within and between said jaw members; a still further object being to provide a handle member detachably coupled with said jaw members to facilitate the movement of the tool over a surface to be scraped; and with these and other objects in view, the invention consists in a tool of the class and for the purpose specified, which is simple in construction, efficient in use, and which is constructed as hereinafter described and claimed.

The invention described and claimed herein is an improvement on that shown and described in a prior patent granted to me October 7, 1930, Number 1,777,677 and is fully disclosed in the following specification of which the accompanying drawings form a part, in which the separate parts of my improvement are designated by suitable reference characters in each of the views, and in which:—

Figure 1:
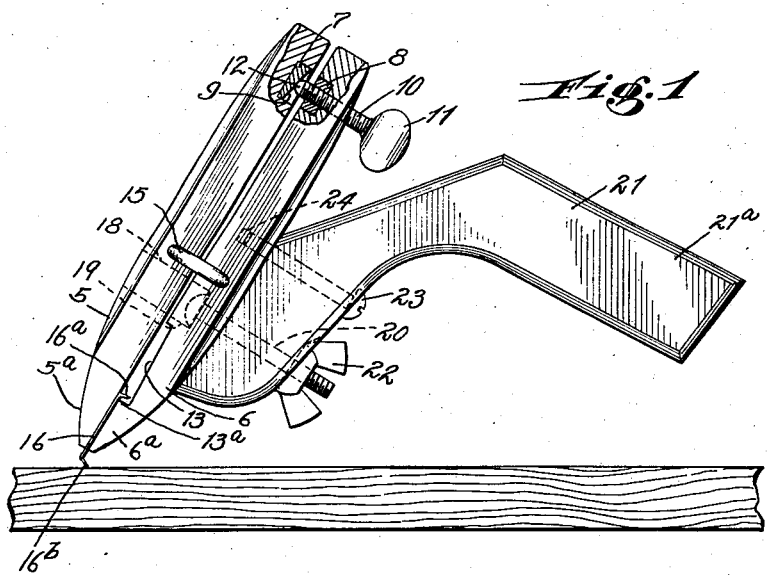
Fig. 1 is a side view of a scraper made according to my invention, with part of the construction broken away and in section.
Figure 2:
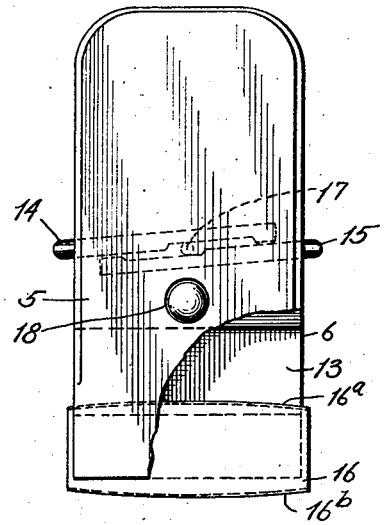
Fig. 2 is a face view of the device with part of the construction broken away.
Figure 3:
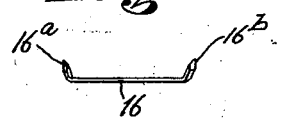
Fig. 3 is an edge view of one of the blades which I employ.

For the purpose of illustrating one method of carrying my invention into effect, I have shown in the accompanying drawings, a tool consisting of two substantially similar jaw members 5 and 6 having relatively flat and substantially parallel inner adjacent surfaces. Countersunk in the adjacent surfaces at the upper end of the jaw members are blocks 7 and 8, the block 7 having a beveled surface 9 in connection with which a clamp screw 10 operates, said screw being in threaded engagement with the block 8 and having a winged head 11.

The inner end 12 of the screw is conical in form to ride upon the beveled face 9 of the block 7 in the operation of clamping the jaw ends 5a and 6a together. The jaw end 6a has upon its inner flat surface, inwardly of the end thereof, a transverse recess 13 which is of greater depth at its outer end than at its inner end for reasons hereinafter stated.

Each jaw member 5 and 6 is apertured at each side thereof to receive U-shaped coupling rods 14 and 15 for pivotally coupling the jaw members together, permitting the separation of the jaw ends 5a for the insertion of a cutter blade or tool 16 as will be apparent. The rods 14 and 15 are held against displacement from the jaw members by a screw 17, this structure being similar to the structure of the scraper disclosed in my prior patent herein referred to.

The jaw member 5 is provided with a relatively large aperture 18 opening through the front and rear face thereof and communicating with a large recess 19 on the inner face of the jaw member 6, said recess receiving the head of a bolt 20 which passes outwardly through the jaw member 6 and is adapted to pass through an aperture in a handle member 21, the latter being held in connection with the jaw member by a winged nut 22. Mounted in connection with the handle member 21 is a screw 23, the end of which is adapted to project into a recess 24 formed in the outer face of the jaw member 6. This screw serves to key the handle member against lateral movement with respect to the jaw member 6.

The hand grip portion 21a of the handle member extends downwardly so that downward pressure may be exerted upon the tool in the operation of moving the same over a surface to be scraped.

Figure 4:
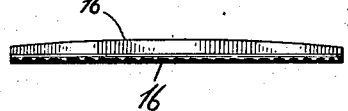
Fig. 4 is a side view of the blade.

One of the distinctive features of my present invention resides in the provision of the blade or cutter 16 which is of the double edged type having two cutting edges 16a and 16b disposed one at each side edge of the blade. The blade is formed from a strip of metal of predetermined width, the side edges of which are curled or turned and then ground or otherwise sharpened to form the cutting edges 16a and 16b. These edges are preferably slightly rounded or arc-shaped in form as seen in Fig. 4 of the drawings, or may be made straight if desired.

It will also be apparent that the blade 16 is comparatively narrow in size as compared with other blades of this class commonly employed in scrapers, and the recess 13 is provided to accommodate the inner edge of the blade when the tool is in one position for use.

As shown in Fig. 1 of the drawings, the edge 16b is shown projecting from the ends of the jaws 5a—6a, while the end 16a is disposed in the recess 13. Whenever desired, the tool may be reversed so as to expose the edge 16a. When the device is not in use, the entire blade 16 may be arranged within the recess 13 which is of sufficient width to accommodate the blade.

By providing greater depth to the recess 13 near the outer edge of the jaw member, the edge 16a as seen in Fig. 1 of the drawings will not engage the bottom wall of the recess, whereas when the entire blade is mounted in the recess, the shallower portion will serve to frictionally engage one of the edges to support the blade against accidental displacement. The shoulder 13a formed by one wall of the recess 13 will act as a stop to limit any outward movement of the blade 16 should it be subjected to undue stress or strain which might tend to withdraw the blade from the jaws.

It will also be understood that by providing the relatively large recess 13, the blade 16 may be supported angularly with respect to the transverse plane of the tool so that one corner of the blade will project a greater degree than the other corner, thus facilitating the use of the tool in producing a plain effect by virtue of the angular arrangement of the cutting edge. This will also facilitate the use of the tool in corners and along the base boards of a floor in that the stock formed by the jaw members 5 and 6 will be disposed angularly with respect to the edge of the tool, providing clearance for this stock as well as the hand gripping the same. It will also be apparent that the blade 16 may be coupled with the jaw members 5 and 6 with one side thereof projecting well beyond the side edge of the jaw members at either side of said jaw members, thus providing a substantially universal mounting of the blades in connection with the jaw members.

One of the outstanding features of my invention resides in the fact that by employing comparatively small blades with double cutting edges, the cost of producing the blade is materially cheapened as compared with other blades of this class it being understood that the blade is made rigid by the flanging of the side edges thereof, and said blade is of sufficient width only, to provide a body portion which will facilitate the clamping and securing of the blade within the holder. Thus, new blades may be substituted for old and worn out blades at a very nominal cost. By providing the recess in the jaws for supporting the blades when not in use, the cutting edges of the blades will be guarded against destruction when the tool is carried about or packed away in a tool kit or case. This also facilitates the packing and shipment of the complete article, and prevents accidents which would be experienced if the blade edge projected beyond the jaw members. In this connection, it will also be understood that the blade 16 may be moved backwardly to dispose the projecting cutting edge adjacent the edge of the jaw member 6a which would partially guard and protect said cutting edge, but this would constitute a temporary means of protection.

It will be understood that while I have shown my improved cutter blade mounted in connection with a tool of specific construction, that my invention is not necessarily limited in these respects, the distinctive feature residing in the provision of a blade supporting stock or body in the form of jaw members fashioned to detachably support blades of the class under consideration. Various changes in and modifications of the construction herein shown and described may be made within the scope of the appended claims without departing from the spirit of my invention or sacrificing its advantages.

Having fully described my invention, what I claim as new and desire to secure by Letters Patent, is:

1. A scraper comprising relative movable jaw members, a blade detachably supported within and between said jaw members, said blade having offset and curved side edges terminating in two continuous arc-shaped cutting edges, one of said jaw members being recessed adjacent the blade supporting end thereof to receive one of the cutting edges in clamping said blade within and between said jaw members with the other cutting edge disposed outwardly thereof, and the width of said recess being greater than the transverse dimensions of the blade whereby the entire blade may be placed in said recess between adjacent faces of said jaw members when not in use.

2. In scrapers of the class described, a blade comprising a relatively narrow, elongated strip of metal made rigid, opposite side edges of said strip being bent to form continuous flanges of a thickness substantially equal to that of said strip and arranged substantially at right angles with respect to the longitudinal plane of the strip, leaving only such width to the body of the strip as to provide for rigid holding thereof, and the free edges of said flanges being sharpened to form two continuous cutting edges.

3. In scrapers of the class described, a blade comprising a relatively narrow elongated strip of metal made rigid, opposite side edges of said strip being bent to form continuous flanges of a thickness substantially equal to that of said strip and arranged substantially at right angles with respect to the longitudinal plane of the strip, leaving only such width to the body of the strip as to provide for rigid holding thereof, the free edges of said flanges being sharpened to form two continuous cutting edges, and said flanges being curved and of greater depth centrally of the blade than at the ends thereof.

4. A scraper comprising relatively movable jaw members, a narrow, elongated blade detachably supported within and between said jaw members, said blade having flanged side edges rendering the blade rigid, one of said jaw members being recessed adjacent the blade supporting end thereof to receive one of the side flanges of said blade in clamping the blade within and between said jaw members with the other side flange disposed outwardly thereof, the blade having only such width to the body thereof as to provide for its rigid mounting between said jaw members, and the free edges of said flanges being sharpened to form two continuous cutting edges.

In testimony that I claim the foregoing as my invention I have signed my name this 25th day of October, 1930.

WILLIAM POTTER.